United States Patent Office 3,634,318
Patented Jan. 11, 1972

3,634,318
RUBBER FORMULATIONS COMPRISING PHENYL-ENEDIAMINES AND N-ARYL SULFENAMIDES
James P. Shoffner, Elk Grove Village, Ill., assignor to Universal Oil Products Company, Des Plaines, Ill.
No Drawing. Filed Aug. 22, 1969, Ser. No. 852,473
Int. Cl. C08c *11/46, 11/62;* C08d *9/00*
U.S. Cl. 260—45.9 R      12 Claims

ABSTRACT OF THE DISCLOSURE

Countervailing the decrease in scorch encountered upon addition of a phenylenediamine antiozonant to a rubber formulation by also incorporating an N-aryl-2-benzothiazolesulfenamide in the formulation.

BACKGROUND OF THE INVENTION

In the processing of rubber compositions a number of different ingredients are milled together. One of the problems associated during such milling is described in the industry as "scorch" and refers to prevulcanization of the rubber prior to curing. As a practical matter, manufacturers of rubber products desire a reasonable time to handle, transport and process the rubber formulation before it is heated and vulcanized to form the rubber products into the desired size and shape.

As another problem associated with the above, the scorch time is considerably decreased when a phenylenediamine antiozonant is incorporated in the rubber formulation. However, it is very desirable and, in most cases, necessary to utilize the phenylenediamine antiozonant in order to duly protect the rubber product from attack by ozone. Accordingly, it is very desirable to find suitable means for retaining the benefits of the ozone protection and still provide sufficient scorch time to permit handling, transportation and processing of the rubber formulation before final vulcanization.

DESCRIPTION OF THE INVENTION

It now has been found that the N-aryl-2-thiazole-2-sulfenamide serves to countervail the decrease in scorch encountered by incorporating a phenylenediamine antiozonant into the rubber formulation.

Any suitable N-aryl - 2 - benzothiazolesulfenamide is used in accordance with the present invention. A particuarly preferred species includes N-phenyl-2-benzothiazolesulfenamide and the N-substituted-phenyl-2-benzothiazolesulfenamides. Specific compounds in this embodiment include N-phenyl-2-benzothiazolesulfenamide, N-p-methylphenyl - 2 - benzothiazolesulfenamide and N-p-methoxyphenyl-2-benzothiazolesulfenamide. Another substituted phenyl derivative is N-p-chlorophenyl-2-benzothiazolesulfenamide. Other N-alkylphenyl or N-dialkylphenyl derivatives may be used. The alkyl group preferably contains from 1 to 6 carbon atoms each. Illustrative compounds include N-p-ethylphenyl-2-benzothiazolesulfenamide, N-p-propylphenyl-2-benzothiazolesulfenamide, N-butylphenyl-2-benzothiazolesulfenamide, N-pentylphenyl - 2 - benzothiazolesulfenamide, N-p-hexylphenyl - 2 - benzothiazolesulfenamide and corresponding compounds having the alkyl group in the ortho or meta position but not necessarily with equivalent results. Other illustrative compounds include N-3,5-di-methylphenylbenzothiazole - 2 - sulfenamide, N - 3,5-di-ethylphenylbenzothiazole-2-sulfenamide, N-3,5-di-propylphenylbenzothiazole-2-sulfenamide, N-3,5-di-butylphenylbenzothiazole-2-sulfenamide, N - 3,5-di-pentylphenylbenzothiazole - 2 - sulfenamide, N-3,5-di-hexylphenylbenzothiazole - 2 - sulfenamide, corresponding compounds in which the alkyl groups are in the 2–3 positions, 2–4 positions, 2–5 positions or 2–6 positions.

The N-arylbenzothiazole-2-sulfenamides generally are preferred for use in the present invention. It is understood that other N-arylthiazole-2-sulfenamides also may be used in accordance with the present invention but not necessarily with equivalent results. Other illustrative thiazole sulfenamides include N-aryl-4,5-di-methylthiazole-2-sulfenamide, N-aryl-4-ethyl-2-thiazolesulfenamide, etc., as well as corresponding naphthyl thiazolesulfenamides. In still another embodiment the N-aryl moiety may comprise N-naphthyl which may contain alkyl, alkoxy, nitro, chloro, etc., substitutions on the naphthyl ring.

The N-aryl-thiazolesulfenamides for use in the present invention are prepared by oxidative condensation in a particular manner. For example, mercaptobenzothiazole is reacted with the desired aryl amine in alcohol solvent and alkali metal hypochlorite of below 0° C. and specifically from —20 to 0° C. For example, N-phenyl-2-benzothiazolesulfenamide is prepared by forming a solution in methanol of 2-mercaptobenzothiazole, aniline and aqueous sodium hydroxide and cooling the solution to below 0° C. in an ice-alcohol bath. An aqueous solution of sodium hypochlorite is separately prepared and cooled to below 0° C. The second solution is added dropwise into the first solution with continuous stirring and the stirring is continued until the reaction is completed. The desired sulfenamide forms as a solid product which is recovered from the reaction mixture by filtering and either is utilized as such or is purified in any suitable manner, as, for example, by elution with ether from a column of alumina.

As hereinbefore set forth the N-aryl-2-thiazolesulfenamide is used in any rubber formulation containing a phenylenediamine antiozonant. The rubber compositions which may be treated in accordance with the present invention include natural rubbers and synthetic rubbers which are subjected to curing during preparation thereof. In general, rubber is classified as a vulcanizable diene hydrocarbon rubber and comprises polymers of conjugated 1,3-dienes, either as polymers thereof or as copolymers thereof with other polymerizable compounds. Natural rubbers include hevea rubber, caoutchouc, balata, guttapercha, etc. Synthetic rubbers include butadiene-styrene copolymer rubber referred to in the art as SBR, Buna N rubber (NBR) produced from butadiene isobutylene, neoprene rubber, ethylene propylene copolymer rubber (EP), terpolymer rubbers as EP terpolymers, polychloroprene, polyisoprene, polybutadiene, etc. It is understood that the term rubber as used in the present specification and claims is intended to include both synthetic rubber and natural rubber which are subjected to curing as a step in the manufacture thereof.

The N-aryl-benzothiazole sulfenamide is used together with any suitable phenylenediamine antiozonant. In one embodiment the phenylenediamine antiozonant is a N,N'-di-sec-alkyl-p-phenylenediamine in which each alkyl contains from 3 to about 20 carbon atoms and preferably from about 6 to about 10 carbon atoms. Particularly preferred antiozonants are N,N'-di-sec-heptyl-p-phenylenediamines and more particularly N,N'-di-(1,4-dimethylpentyl)-p-phenylenediamine and N,N'-di-sec-octyl-p-phenylenediamines and particularly N,N'-di-(1-ethyl-3-methylpentyl)-p-phenylenediamine and N,N'-di-(1-methylheptyl)-p-phenylenediamine. Other N,N'-di-sec-alkyl-p-phenylenediamines include N,N'-di-sec-hexyl-p-phenylenediamine, including N,N'-di-(1-methylpentyl)-p-phenylenediamine and N,N'-di-(1-ethylbutyl)-p-phenylene-diamine, other N,N'-di-sec-heptyl-p-phenylenediamines including N,N' - di - (1-ethylpentyl)-p-phenylenediamine, N,N'-di-(1-propylbutyl)-p-phenylenediamine, other N,N'-di-sec-octyl-p-phenylene-diamines including N,N'-di-(1-propylpentyl)-p-phenylenediamine, N,N'-di-sec-nonyl-p-phenylenediamine including N,N'-di-(1-methyloctyl)-p-phenylenediamine, N,N'-di-(1-ethylheptyl)-p-phenylenediamine, N,N' - di - (1-butylpentyl)-p-phenylenediamine, etc., and N,N'-di-sec-decyl-p-phenylenediamines including N,N'-di-(1-methylnonyl)-p-phenylenediamine, N,N'-di-(1-ethyloctyl)-p-phenylenediamine, N,N'-di-(1-propylheptyl) - p - phenylenediamine, N,N'-di-(1-butylhexyl)-p-phenylenediamine, etc.

In another embodiment, the phenylenediamine antiozonant is an N-phenyl-N'-sec-alkyl-p-phenylenediamine in which the alkyl contains from 3 to about 20 and preferably from 3 to 10 carbon atoms. Particularly preferred antiozonants in this embodiment include N-phenyl-N'-(1,3-dimethylbutyl)-p-phenylenediamine and N-phenyl-N'-(2-octyl)-p-phenylenediamine. Other antiozonants in this embodiment include N-phenyl-N'-isopropyl-p-phenylenediamine, N - phenyl-N'-(1-methylpropyl)-p-phenylenediamine, N-phenyl - N' - (sec-pentyl)-p-phenylenediamine including N-phenyl-N'-(1-methylbutyl)-p-phenylenediamine and N-phenyl-N'-(1-ethylpropyl)-p-phenylenediamine, other N-phenyl-N'-(sec-hexyl)-p-phenylenediamines including N-phenyl-N'-(1-methylpentyl)-p-phenylenediamine and N-phenyl-N'-(1-ethylbutyl)-p-phenylenediamine, N-phenyl-N'-sec-heptyl-p-phenylenediamines including N - phenyl-N'-(1-methylhexyl)-p-phenylenediamine, N-phenyl-N'-(1-ethylpentyl)-p-phenylenediamine, N-phenyl - N' - (1-ethyl-3-methylbutyl)-p-phenylenediamine and N-phenyl-N'-(1-propylbutyl)-p-phenylenediamine, other N-phenyl - N' - (sec-octyl)-p-phenylenediamines including N-phenyl-N'-(1-ethylhexyl)-p-phenylenediamine, N-phenyl-N'-(1-ethyl - 4 - methylpentyl-p-phenylenediamine and N-phenyl-N'-(1-propylpentyl-p-phenylenediamine, N-phenyl - N' - (sec-nonyl)-p-phenylenediamines including N-phenyl-N'-(1-methyloctyl)-p-phenylenediamine, N-phenyl-N'-(1,6-di-methylheptyl)-p-phenylenediamine, N-phenyl-N'-(1-ethylheptyl-p-phenylenediamine and N-phenyl-N'-(1-propylhexyl)-p-phenylenediamine, and N-phenyl-N'-(sec-decyl)-p-phenylenediamines including N-phenyl-N'-(1-methylnonyl)-p-phenylene, N - phenyl-N'-(1,7-dimethyloctyl)-p-phenylenediamine, N - phenyl-N'-(1-ethyloctyl)-p-phenylenediamine, N - phenyl-N'-(1,5-diethylhexyl)-p-phenylenediamine, N-phenyl-N'-(1-butylhexyl)-p-phenylenediamine, etc.

In still another embodiment the phenylenediamine antiozonant is an N,N'-di-cycloalkyl-p-phenylenediamine and particularly N,N'-di-cyclohexyl-p-phenylenediamine.

The phenylenediamine antiozonants are available commercially or may be prepared in any suitable manner. In a preferred method, these are prepared by the reductive alkylation of p-phenylenediamine or p-nitroaniline with the desired ketone. For example, N,N'-di-(1-methylheptyl)-p-phenylenediamine is prepared by reductive alkylation of 1 mol proportion of p-nitroaniline with 2 mol proportions of methyl hexyl ketone. Similarly, N-phenyl - N' - (1,3-dimethylbutyl)-p-phenylenediamine is prepared by the reductive alkylation of equal mol proportions of p-aminodiphenylamine, p-nitrodiphenylamine or p-nitrosodiphenylamine with methyl isobutyl ketone. In a similar manner, N - phenyl-N'-(1-methylheptyl)-p-phenylenediamine is prepared by the reductive alkylation of equal mol proportions of p-aminodiphenylamine with methyl hexyl ketone. Also, N,N'-di-cyclohexyl-p-phenylenediamine is prepared by the reductive alkylation of one mole proportion of p-nitroaniline with 2 mol proportions of cyclohexanone.

The reductive alkylation is effected in any suitable manner and generally under a hydrogen pressure of from about 100 to 3,000 p.s.i. or more and more particularly of from about 1,000 to about 2,000 p.s.i. and a temperature of from about 200° to about 500° F. and more particularly from about 250° to about 350° F. Generally an excess of ketone is used in the reaction mixture and may comprise up to about 20 or more mols of ketone per mol of p-nitroaniline or p-phenylenediamine. Any suitable reductive alkylation catalyst is used. One catalyst comprises an intimate mixture of copper oxide, chromium oxide and barium oxide. Other catalysts include those containing nickel, molybdenum, platinum and/or palladium. A particularly preferred catalyst comprises a composite of alumina with from about 0.1% to 10% or more of platinum, which composite may or may not contain chlorine and/or fluorine in a total concentration of from about 0.2% to 10% or more by weight of the composite.

The phenylenediamine antiozonant is used in a sufficient concentration to effect the desired stabilization. The concentration may range from about 1.5% to about 6% and more particularly from 2% to 4% by weight of the rubber although higher or lower concentrations may be employed when desired. These concentrations are based on the rubber hydrocarbon exclusive of the other components of the rubber composition and are used in this manner in the present specifications and claims.

As hereinbefore set forth and as will be illustrated in the appended examples, the phenylenediamine antiozonant decreases the scorch and such decrease is offset, at least in part, by also including the N-aryl-2-benzothiazolesulfenamide in the rubber formulation. The N-aryl-2-benzothiazolesulfenamide is used in a suitable concentration to accomplish the desired objective and may range from about 0.5 to about 3 and preferably from about 1 to about 2 phr. (parts per 100 parts by weight of rubber hydrocarbon). The concentrations used in the present specification and claims are on the basis of the rubber hydrocarbon.

Conventional rubber formulations, including oil extended rubber, may be used and may include, in addition to the phenylenediamine antiozonant and sulfenamide, one or more antioxidants, retarders, fillers, softeners, extenders, wax reinforcing agents, etc. Illustrative antioxidants include 2,6-di-tert-butyl - 4 - methylphenol, phenyl-beta-naphthylamine, 6-phenyl-2,2,4-trimethyl-1,2-dihydroquinoline, marketed under the tradename of "Santoflex-B," 2,2-methylene-bis-(4-methyl - 6 - tert-butyl-phenol), the reaction product of acetone and diphenylamine, marketed under the tradename of "B.L.E.," etc. These antioxidants generally are used in a concentration of from about 0.5 to about 3% by weight of the rubber hydrocarbon. It is understood that conventional accelerators may also be included in the rubber formulation and these include other benzothiazolesulfenamides, other thiazoles, thiuram sulfides, guanidine, dithiocarbamates, etc.

When desired, the composition of the present invention also is used along with paraffin and/or microcrystalline wax. The wax generally is utilized in a concentration of from 0.5% to about 3% by weight of the rubber hydrocarbon.

In addition to the importance of retarding scorch, the additive must not adversely affect subsequent curing in order to obtain a rubber product of desired physical properties. It has been found that the variously substituted N-phenyl-benzothiazolesulfenamides affect the properties of the cured product somewhat differently and therefore the N-aryl-derivative will be selected with regard to the properties desired in the final rubber product.

Conventional milling procedure may be employed, with the N-aryl-2-benzothiazolesulfenamide being incorporated into the composition either separately or along with one or more other ingredients.

The following examples are introduced to illustrate further the novelty and utility of the present invention but not with the intention of unduly limiting the same.

EXAMPLE I

N-phenyl-2-benzothiazolesulfenamide was prepared by forming a solution in methanol of 34 g. (0.2 mole) of 2-mercaptobenzothiazole, 46.5 g. (0.5 mole) of aniline and 20 ml. of a 50% aqueous solution of sodium hydroxide and cooling the solution to −8° C. in an ice-alcohol bath. The alcohol used was commercial Formula 30. A separate solution (150 ml.) of 10% by weight of sodium hypochlorite was separately prepared and chilled to −8° C. The second solution was added dropwise over a period of 20 minutes into the first solution, with continuous stirring. The mixture was stirred for an additional 30 minutes and then filtered. There was recovered 10.5 g. of solid material comprising the desired sulfenamide. The sulfenamide was purified by elution from a column of alumina (75 g. of 60–200 mesh) with ether (1.5 liter) to yield the N-phenyl-benzothiazolesulfenamide, having a melting point of 126–129° C. The composition of the product was confirmed by NMR (nuclear magnetic resonance) and IR (infrared) analyses.

The corresponding N-methylphenyl and N-p-methoxyphenyl-2-benzothiazolesulfenamides were prepared in substantially the same manner except that, instead of aniline, p-methylaniline and p-methoxyaniline were used as the reactants. Additional N-aryl-2-benzothiazolesulfenamides or N-aryl-2-thiazolesulfenamides are prepared in substantially the same manner except that the different reactants will be used in the preparation.

EXAMPLE II

The rubber composition of this example was of the following recipe:

| Ingredient: | Parts by weight |
|---|---|
| SBR 1502 | 100 |
| Furnace black | 40 |
| Zinc oxide | 3 |
| Stearic acid | 2 |
| Sulfur | 2 |
| Sulfenamide | 1.25 |
| Antiozonant (when used) | 3.32 |

The ingredients were incorporated by conventional milling procedure and the formulation was cured for 40 minutes at 140° C.

The scorch values were determined with the large rotor Mooney viscometer at 250° F. (ASTM D–1077–55T). The values represent the number of minutes for a rubber containing a curing agent to increase viscosity by 5 and then 20 pounds. This method simulates conditions encountered during milling. Thus, a high scorch value indicates a high resistance to scorching.

The data in the following table reports the results of the evaluations.

| Run No. | Benzothiazole sulfenamide | Antiozonant* | Mooney Scorch 5 pt. rise | Mooney Scorch 20 pt. rise |
|---|---|---|---|---|
| 1 | N-cyclohexyl | No | 56.1 | 60.8 |
| 2 | do | Yes | 18.0 | 20.5 |
| 3 | N-phenyl | No | 82.6 | 115.2 |
| 4 | do | Yes | 48.0 | 56.4 |
| 5 | N-p-methylphenyl | No | 80.4 | 105.6 |
| 6 | do | Yes | 43.7 | 49.8 |
| 7 | N-p-methoxyphenyl | No | 67.1 | 78.5 |
| 8 | do | Yes | 30.9 | 35.1 |

*N, N′-di-2-octyl-p-phenylenediamine.

As mentioned above, the sulfenamides were used in a concentration of 1.25 phr. The antiozonant was used in a concentration of 3.32 phr.

Referring to the data in the above table, it will be seen that the sulfenamides of the present invention offset to a satisfactory extent the decrease in scorch time encountered upon the addition of the antiozonant into the rubber formulation. For comparative purposes, it will be noted that this decrease in scorch time was considerably less than when using N-cyclohexyl-benzothiazole sulfenamide.

EXAMPLE III

Also, of importance is the proper curing of the rubber formulation in order to prepare a product of the desired physical properties. The specific physical properties desired will depend upon the ultimate use of the rubber product. For example, the ultimate elongation is an important requirement in the preparation of rubber for use in rubber bands and the like.

In the formulation as described in Example II the sample containing the same phenylenediamine antiozonant and N-cyclohexyl-benzothiazolesulfenamide and an ultimate elongation of 550%. The samples containing the same antiozonant and the N-phenyl, N-p-methylphenyl and N-p-methoxyphenyl derivatives had ultimate elongations of 445%, 520% and 575%, respectively. Accordingly, for this requirement the N-p-methoxy derivative would be preferred.

EXAMPLE IV

When considering tensile strength of the rubber product as an important requirement, the N-p-methoxyphenyl derivative also appears best of the N-aryl derivatives. The sample containing the same phenylenediamine antiozonant and the N-p-methoxyphenyl-benzothiazolesulfenamide had a tensile strength of 2780 pounds. This is only slightly less than the tensile strength of 3000 pounds in the product containing the same phenylenediamine antiozonant and N-cyclohexyl-benzothiazolesulfenamide.

EXAMPLE V

The rubber formulation of the recipe described in Example II is prepared to contain 3 phr. of N,N′-di-(1,4-dimethylpentyl) - p - phenylenediamine as the antiozonant. This serves to reduce the scorch time from 56.1 to 15.7 for the 5 pt. rise and from 60.8 to 17.1 for the 20 pt. rise, respectively. However, also incorporating 1.5 phr. of N-phenyl-benzothiazole sulfenamide serves to partly offset this decrease and results in scorch of sufficient time to permit practical handling of the rubber formulation prior to vulcanization.

EXAMPLE VI

This example describes the use of the N-aryl-benzothiazole sulfenamide in a tank tread stock of the following base recipe:

| Ingredient: | Parts by weight |
|---|---|
| SBR (Philiprene 1609) | 145.0 |
| Carbon black | 15.0 |
| Zinc oxide | 5.0 |
| Mineral rubber (Witco 38 MR) | 5.0 |
| Stearic acid | 2.0 |
| Sulfur | 1.80 |
| Santoflex DD [1] | 1.0 |
| Agerite Resin D [2] | 1.0 |
| Santocure NS [3] | 0.65 |
| DIBS [4] | 0.65 |
| Antiozonant [5] | As indicated |

[1] 6-dodecyl-1,2-dihydro-2,2,4-trimethylquinoline.
[2] Polymerized trimethyldihydroquinoline.
[3] N-tert-butyl-2-benzothiazolesulfenamide.
[4] N,N-diisopropyl-benzothiazole-2-sulfenamide.
[5] N,N′-dicyclohexyl-p-phenylenediamine.

The sample of the rubber prepared from the base recipe but not containing the antiozonant had a 5 pt. rise of 61.3 and a 20 pt. rise of 77.1 minutes. In another sample of the same base recipe but containing 3 phr. of N,N′-dicyclohexyl-p-phenylenediamine, the Mooney properties were 27.6 for the 5 pt. rise and 34.6 for the 20 pt. rise. This reduction in scorch time is offset by also incorporating in the rubber formulation 1.5 phr. of N-phenyl-benzothiazole sulfenamide.

EXAMPLE VII

Natural rubber is compounded in a conventional manner to contain 3 phr. of N-phenyl-N′-(1,3-dimethylbutyl-p-phenylenediamine) and 1.25 phr. of N-p-methylphenyl-benzothiazole sulfenamide. The rubber is protected against ozone cracking and also possesses a higher Mooney scorch value.

EXAMPLE VIII

This example illustrates the use of N-p-methoxyphenyl-benzothiazole sulfenamide as a scorch retarder in nitrile rubber. The nitrile rubber is compounded in conventional manner to include 3.5 phr. of N-phenyl-N'-sec-octyl-p-phenylenediamine and 1.25 phr. of N-p-methoxyphenyl-benzothiazole sulfenamide. Here again the rubber will be protected against ozone cracking and also has a longer scorch value.

I claim as my invention:

1. Natural or synthetic vulcanizable diene hydrocarbon or nitrile rubber formulation containing
   (A) a phenylenediamine antiozonant containing only carbon, hydrogen and nitrogen; and,
   (B) an N-aryl-benzothiazole sulfenamide in which the aryl is selected from the group consisting of lower alkoxyphenyl, chlorophenyl and mono- or di-alkyl-phenyl wherein the alkyl group(s) contain from 1 to 6 carbon atoms each.

2. Natural or syntheic vulcanizable diene hydrocarbon or nitrile rubber formulation containing
   (A) a phenylenediamine antiozonant containing only carbon, hydrogen and nitrogen; and
   (B) N-phenyl-benzothiazolesulfenamide.

3. The composition of claim 1 in which the sulfenamide is used in a concentration of from about 0.5 to about 3 phr.

4. The composition of claim 1 in which the sulfenamide is N-p-methylphenyl-benzothiazolesulfenamide.

5. The composition of claim 1 in which the sulfenamide is N-p-methoxyphenyl - benzothiazolesulfenamide.

6. The composition of claim 1 in which the antiozonant is N,N'-di-sec-alkyl-p-phenylenediamine in which each alkyl contains from 3 to about 20 carbon atoms.

7. The composition of claim 6 in which the antiozonant is N,N'-di-sec-octyl-p-phenylenediamine.

8. The composition of claim 1 in which the antiozonant is N-phenyl-N'-sec-alkyl - p - phenylenediamine in which the alkyl contains from 3 to about 20 carbon atoms.

9. The composition of claim 1 in which the antiozonant is N,N'-di-cyclohexyl-p-phenylenediamine.

10. The composition of claim 1 in which the rubber is butadiene-styrene copolymer.

11. The composition of claim 1 in which the rubber is natural rubber.

12. The composition of claim 1 in which the rubber is nitrile rubber.

References Cited

UNITED STATES PATENTS

| 2,321,305 | 6/1943 | Messer | 260—788 |
|---|---|---|---|
| 2,695,904 | 11/1954 | Cooper et al. | 260—788 |
| 2,704,752 | 3/1955 | Mathes et al. | 260—79.5 |
| 2,867,604 | 1/1959 | Rosenwald et al. | 260—45.9 |
| 3,069,398 | 12/1962 | Freytag et al. | 260—79.5 |
| 3,189,650 | 6/1965 | Chenicek | 260—573 |
| 3,304,284 | 2/1967 | Cox | 260—45.9 |
| 3,304,285 | 2/1967 | Cox | 260—45.9 |
| 3,515,771 | 6/1970 | Roy | 260—788 |
| 3,491,069 | 1/1970 | Brooks et al. | 260—79.5 |
| 3,513,139 | 5/1970 | Coran et al. | 260—79.5 |

DONALD E. CZAJA, Primary Examiner

R. A. WHITE, Assistant Examiner

U.S. Cl. X.R.

260—79.5 R, 788, 809